United States Patent Office 2,819,229
Patented Jan. 7, 1958

2,819,229

PREPARATION OF MICROSPHERE CHROMIA-ALUMINA CATALYST

Harold A. Strecker and James L. Callahan, Bedford, Ohio, assignors to The Standard Oil Company, Cleveland, Ohio, a corporation of Ohio No Drawing. Application December 23, 1953
Serial No. 400,087

2 Claims. (Cl. 252—448)

The present invention relates to a process for the manufacture of a chromia-alumina catalyst in the form of microspherical particles.

Catalysts which are composed predominantly of coprecipitated mixtures of alumina and chromia, i. e., aluminum oxide and chromium oxide have been widely used in various types of hydrocarbon conversion and reforming reactions. The catalysts of this type are conventionally prepared by co-precipitating precursors of the two ingredients as a hydrogel folowed by the washing and drying of the hydrogel precipitate. The catalysts may also contain minor amounts of one or more additional promoting oxides, such as the oxides of platinum, palladium, antimony, and other metals. A further description of various types of catalysts which are composed predominantly of chromia and alumina may be found in prior Patent No. 2,236,514 assigned to our assignee, and also in copending application Serial No. 313,786, filed October 8, 1952 in which one of the present applicants is a joint inventor.

The coprecipitated chromia-alumina catalysts, such as those described hereinabove, have been suggested for use both in fixed bed and fluidized catalytic reforming processes. In the fixed bed process, the weight and size of the individual particles of catalyst are not critical and the preparation of catalysts for this purpose has not presented any unusual difficulties. However, in a fluidized process, the weight and size of the catalyst particles are critical factors which greatly influence the behavior of the catalyst. As can readily be seen, these criticalities arise from the fact that in a fluidized process the catalyst particles must be of such size and weight that they will remain in suspension in a stream of gas.

It has previously been found that in a fluidized process excellent results from the standpoint of fluidization are achieved when the catalyst particles are spherical and it has been proposed that such spherical catalysts, commonly called microsphere catalysts, be made by spray drying an aqueous slurry or solution of catalyst.

When we attempted to prepare microspherical particles of chromia-alumina catalysts, we experienced several difficulties in obtaining particles of satisfactory weight and size. These difficulties were found to stem from the fact that the maximum solids content of a pumpable, aqueous slurry of chromia-alumina hydrogel is about 4 to 6% by weight. We found that by spray drying a slurry of this solids content we could not produce a catalyst of sufficiently large particle size to be satisfactory for fluidized reforming processes.

In accordance with our invention we have found surprisingly that the incorporation of a small amount of acetic acid into a slurry of chromia-alumina hydrogel has the effect of decreasing the viscosity of the slurry thereby making it possible to prepare a pumpable slurry having a solids content as high as about 15% by weight.

Accordingly, our process, which is based on the aforesaid discovery, comprises adding acetic acid to an aqueous chromia-alumina hydrogel in an amount to form a pumpable slurry of said hydrogel having a solids content from about 8 to about 15%, and then spray drying the resultant slurry to produce microspheres of chromia-alumina catalyst. By the spray drying of a slurry containing the specified quantity of solids, it is possible to produce a catalyst in spherical form in which the particle size and weight are satisfactory for fluidized reforming processes.

We are aware that in U. S. Patent No. 2,457,970 to Baillie it is suggested that acetic acid be added to a silicic acid solution for the purpose of increasing the viscosity of the solution preparatory to spray drying. However, in our process, which involves a slurry of hydrogel, the acetic acid has the directly opposite effect on viscosity.

Our process can be applied effectively in the preparation of any catalyst which is composed predominantly of chromia and alumina. This includes catalysts which are promoted with minor amounts, generally not more than about 20% by weight, of one or more promoting oxides such as the oxides of platinum, palladium, antimony, cadmium, thorium, uranium and other metals.

The relative proportion of chromia and alumina in the catalyst does not appear to be significant since the acetic acid has the ability to lower the viscosity of the hydrogel slurry regardless of the chromia-alumina ratio. Generally, however, most chromia-alumina catalyst contain from 10 to about 30 mol percent of chromia.

The process may be illustrated by a typical preparation as follows:

Solutions of chromium acetate and sodium aluminate are mixed together in accordance with conventional practice to form a precipitate of chromia-alumina hydrogel, which is allowed to age for a period of time. The precipitate is then filtered and the filter cake washed with water. Normally, at this point the washed filter cake contains about 8–12% by weight of solids and in order to produce a pumpable slurry, it is necessary to add water to the filter cake. If no acetic acid is added, it is not possible to prepare a pumpable slurry having a solids content greater than about 6% by weight. However, if a small amount of acetic acid is added thereto, the viscosity of the cake is lowered to such an extent that it is possible to prepare a pumpable slurry with a solids content as high as 15% by weight.

Ordinarily, we recommend that subsequent or prior to the addition of acetic acid to the filter cake, the solids content be adjusted, if necessary, to that which is desired for spray drying to obtain particles of optimum size. In this connection, we have found that pumpable slurries of the maximum content of solids possible without the addition of acetic acid, i. e., 4 to 6% by weight, will, when spray dried, produce particles of too small a size to be used conveniently in a fluidized reforming process. However, when the solids content of the slurry is higher, microspherical particles of larger size result from the spray drying operation.

Generally, for microspherical type catalysts to be used in fluidized processes, weight average particle sizes ranging from 30 to about 80 microns in diameter are preferred. In order to obtain particles approximating this size, we recommend that the slurry to be spray dried contain from about 8 to about 15% by weight of solids, preferably from about 8 to about 10% by weight.

The amount of acetic acid to be added to the slurry does not appear to be critical and can be fairly widely varied. Generally, enough acid is used to lower the viscosity of the slurry sufficiently to permit the preparation of a pumpable slurry of the desired solids content. An amount within the range of about 0.3 to about 2% by weight of the slurry, preferable from about 0.5 to 1% by weight, is ordinarily sufficient for this purpose.

In order to illustrate the invention, the following example is presented. Percentages are by weight unless otherwise specified.

Example 1

A chromium acetate solution was prepared by dissolving 38.8 grams $Na_2Cr_2O_7 \cdot 2H_2O$ in 130 ml. of water to which was added 43.3 grams of 96% sulfuric acid diluted with 130 ml. of water. Forty-five (45) ml. of 95% ethanol, diluted with 130 ml. of water were added from a dropping funnel while stirring, with the temperature of the mixture being held at 150° F. or slightly lower. The mixture was stirred for 0.5 hour after the addition of the ethanol and then heated on a steam bath for ½ hour. The resulting solution was then allowed to cool under vacuum to remove the unreacted alcohol and volatile oxidation products of the alcohol. There was next added a solution of 35.6 grams of calcium acetate monohydrate dissolved in 560 ml. of water and the mixture was then allowed to stand for 12 hours and then filtered. The filter cake was washed twice with distilled water and the wash water was added to the filtrate which was then diluted to 10 liters in preparation for the subsequent precipitation step.

A sodium aluminate solution was prepared by mixing in the dry state 192 grams of heavy alumina hydrate and 120 grams of sodium hydroxide in a nickel crucible. About 200 to 300 ml. of water was added to the dry mixture with stirring and the resultant mixture was then boiled until a clear solution was obtained. The solution was diluted with water to a volume of about 500 to 600 ml. by pouring over cracked ice. It was then filtered to remove insoluble material. Just prior to the subsequent precipitation step the solution was diluted to 1 liter.

In preparation for the precipitation step, aliquot portions of the chromium acetate and sodium aluminate solutions were mixed, the pH determined, and sufficient glacial acetic acid was added to reduce the pH to 10. The calculated equivalent volume of acetic acid was then added to the bulk of the chromium acetate solution. In effecting the precipitation, the respective solutions were fed to a reaction vessel using variable rate feed pumps. Initially, the solutions were fed in a ratio of 10 parts by weight of chromium acetate solution to 1 part by weight of sodium aluminate solution. The pH of the mixture was measured continuously and maintained at 10±0.5 by small variations in the feed rate of the chromium acetate solution. During the mixing of the solutions a precipitate formed in the reaction vessel. The precipitate was allowed to age in the vessel for a period of about 12 hours and was then filtered using a plate and frame filter press. The filter cake was washed in place with 30 liters of tap water and then with 10 liters of distilled water. It contained about 10 mol percent of chromia and 90 mol percent of alumina.

The wet filter cake was removed from the press and found to have a solids content of about 12%. A portion of the filter cake was next prepared for spray drying by adding about 1% of glacial acetic acid by weight of the entire cake and then passing the cake through an Eppenbach colloid mill followed by hand stirring with a wooden paddle to obtain a homogeneous slurry. The slurry thus prepared was of a pumpable viscosity.

To another portion of the filter cake there was added an amount of water to reduce the solids content to about 6% by weight and a homogeneous slurry was prepared by one passage through an Eppenbach colloid mill and hand stirring. This slurry was pumpable but barely so.

It was attempted to prepare a slurry from another portion of the wet filter cake to which no water or glacial acetic acid was added. A passage through the colloid mill and subsequent hand stirring failed to produce a pumpable slurry.

The slurries which have been prepared from the portions of the filter cake to which glacial acetic acid and water had been added were spray dried in a conventional disc-type spray dryer operated in the conventional manner. Microspherical particles of chromia-alumina catalyst were obtained from both slurries. The weight average particle size and particle size distribution of the spheres was then determined by microscopic examination (Handbook of Chemical Microscopy, volume I, Chamot and Mason). Also, the percent volatile material at 1000 F. and the bulk density of the catalyst were determined. The results of these determinations on the two catalysts are tabulated below:

|  | 6% solids slurry | 12% solids slurry |
|---|---|---|
| Maximum Diameter (microns) | 27 | 57 |
| Weight Average Diameter (microns) | 15 | 33 |
| Bulk Density (grams/cc.) | 0.934 | 0.675 |
| Weight percent Volatiles | 31.1 | 27.3 |

From the data, it is seen that the slurry prepared according to the process of the invention produced considerably larger particles of catalyst when spray dried than did the slurry prepared without the addition of acetic acid. Furthermore, the catalyst produced by the process of the invention had a weight average particle size and bulk density satisfactory for fluidized reforming processes.

It is intended to cover all changes and modifications in the example of the invention, herein given for purposes of disclosure, which do not constitute departure from the spirit and scope of the appended claims.

We claim:

1. A process for the preparation of a microspherical chromia-alumina catalyst comprising 10 to 30 mol percent chromia, which comprises precipitating an aqueous chromia-alumina hydrogel at a pH of about 10, filtering to form a filter cake having 8 to 12% solids, which filter cake is not pumpable unless diluted with water to solid contents of not more than 6%, adding an amount of acetic acid within the range 0.3 to 2% by weight of said filter cake to said chromia-alumina hydrogel filter cake and adjusting the solids content, if necessary, to form a pumpable slurry having a solids content of about 8 to 15%, and spray-drying said pumpable slurry to produce microspheres of chromia-alumina catalyst having a diameter of at least 30 microns and larger than can be obtained without the acetic acid addition.

2. A process for the preparation of a microspherical chromia-alumina catalyst comprising 10 mol percent chromia, which comprises precipitating an aqueous chromia-alumina hydrogel at a pH of about 10, filtering to form a filter cake having about 12% solids, which filter cake is not pumpable unless diluted with water to solid contents of not more than 6%, and when spray-dried gives microspheres having an average diameter of about 15 microns, adding about 1% acetic acid by weight of said filter cake to said chromia-alumina hydrogel filter cake to form a pumpable slurry having a solids content of about 12% and spray-drying said acetic acid treated pumpable slurry to produce microspheres of chromia-alumina catalyst having an average diameter of about 33 microns.

References Cited in the file of this patent

UNITED STATES PATENTS

| 2,457,970 | Bailie | Jan. 4, 1949 |
| 2,635,082 | Smith | Apr. 14, 1953 |
| 2,645,619 | Hoekstra | July 14, 1953 |

FOREIGN PATENTS

| 586,945 | Great Britain | Apr. 8, 1947 |
| 644,322 | Great Britain | Oct. 11, 1950 |